United States Patent
Nagel et al.

(10) Patent No.: US 11,085,846 B2
(45) Date of Patent: Aug. 10, 2021

(54) MICROMECHANICAL SENSOR DEVICE WITH INTEGRATED HOUSING SEAL, MICROMECHANICAL SENSOR ASSEMBLY, AND CORRESPONDING MANUFACTURING METHOD

(71) Applicant: Robert Bosch GmbH, Stuttgart (DE)

(72) Inventors: Cristian Nagel, Herrenberg (DE); Frederik Ante, Ludwigsburg (DE); Sebastian Schuler-Watkins, Herrenberg (DE); Timo Lindemann, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 174 days.

(21) Appl. No.: 16/481,369

(22) PCT Filed: Jan. 30, 2018

(86) PCT No.: PCT/EP2018/052259
§ 371 (c)(1),
(2) Date: Jul. 26, 2019

(87) PCT Pub. No.: WO2018/145950
PCT Pub. Date: Aug. 16, 2018

(65) Prior Publication Data
US 2019/0391029 A1     Dec. 26, 2019

(30) Foreign Application Priority Data
Feb. 9, 2017  (DE) .......................... 102017202023.7

(51) Int. Cl.
*G01L 19/06*    (2006.01)
*G01L 19/00*    (2006.01)
*G01L 19/14*    (2006.01)

(52) U.S. Cl.
CPC ...... *G01L 19/0654* (2013.01); *G01L 19/0069* (2013.01); *G01L 19/147* (2013.01)

(58) Field of Classification Search
None
See application file for complete search history.

(56) References Cited

U.S. PATENT DOCUMENTS

2008/0157236 A1  7/2008  Chen et al.
2012/0280335 A1  11/2012 Zoellin et al.

FOREIGN PATENT DOCUMENTS

DE        19840829 A1    3/2000
DE     102004011148 B3   11/2005
(Continued)

OTHER PUBLICATIONS

International Search Report for PCT/EP2018/052259, dated Mar. 27, 2018.

*Primary Examiner* — Lisa M Caputo
*Assistant Examiner* — Nigel H Plumb
(74) *Attorney, Agent, or Firm* — Norton Rose Fulbright US LLP; Gerard Messina

(57) ABSTRACT

A micromechanical sensor device is described that includes an integrated housing seal, a micromechanical sensor assembly, and a corresponding manufacturing method. The micromechanical sensor device with an integrated housing seal is equipped with a micromechanical sensor chip that includes an upper side and a lower side, a sensor area that may be brought into contact with an environmental medium being provided on or at the upper side, and is equipped with at least one circumferential trench, open toward the upper side, that is provided in the periphery of the sensor area and that is at least partly filled with a sealing medium for sealing a corresponding area of a housing to be mounted thereon.

11 Claims, 3 Drawing Sheets

(56) References Cited

FOREIGN PATENT DOCUMENTS

| | | |
|---|---|---|
| DE | 102008024737 B3 | 1/2010 |
| DE | 102010002545 A1 | 9/2010 |
| DE | 102010030457 A1 | 12/2011 |
| DE | 102010064120 A1 | 6/2012 |
| DE | 102011084582 B3 | 2/2013 |
| DE | 102014114014 A1 | 4/2015 |
| DE | 102014224063 B3 | 3/2016 |

MICROMECHANICAL SENSOR DEVICE WITH INTEGRATED HOUSING SEAL, MICROMECHANICAL SENSOR ASSEMBLY, AND CORRESPONDING MANUFACTURING METHOD

FIELD OF THE INVENTION

The present invention relates to a micromechanical sensor device having an integrated housing seal, to a micromechanical sensor assembly, and to a corresponding manufacturing method.

BACKGROUND INFORMATION

Although any micromechanical components are applicable, the present invention and its underlying object to be achieved are explained with reference to micromechanical components that include pressure sensors.

Micromechanical environmental sensors, for example pressure sensors, are generally built up on level 1 in so-called "cover-based" housings. This means that the sensor chips, for example including the sensor together with a sensor diaphragm and a necessary evaluation electronics system in the form of an ASIC, are applied to a substrate such as a lead frame or circuit board by gluing. The contacting of the components to one another or to the substrate is ensured by wire bonds. A cover is subsequently glued onto the substrate to protect the sensor components from damage. An opening is situated in the cover which allows environmental influences such as air pressure, hydrogen content, moisture content, etc., to be detected by the sensor chip.

However, in this concept, sufficient protection from water is not provided on account of the design. As a result, these types of pressure sensors cannot be installed in applications that require watertightness, such as smart phones or wearables.

Although watertight pressure sensors are known, they require a special form of cover having a flue, which requires a relatively large installation space. The sensors in the system itself are covered with a large amount of gel, as the result of which in particular the offset or the sensitivity may change over temperature changes or the service life. In addition, the substrate of the sensors is mechanically connected to the customer housing above the flue, as the result of which external stress effects, for example due to handling and temperature, may directly act on the sensor.

German Published Patent Application No. 10 2010 030 457 describes a housed micromechanical component, the housing including a media access point to a cavity of a pressure sensor situated above a diaphragm area.

German Patent No. 10 2011 084 582 describes a micromechanical sensor device that includes a sensor chip, a circuit chip, and a molded package. The molded package includes a cavity above the sensor chip that has media access via a through hole.

SUMMARY

The present invention provides a micromechanical sensor device having an integrated housing seal, a micromechanical sensor assembly, and a corresponding manufacturing method.

The concept underlying the present invention is to provide a sealing structure directly on the chip level. For example, this sealing structure may already be produced on the wafer level in the batch process. This allows a compact, watertight micromechanical sensor assembly to be easily manufactured.

In particular, the application effort for customer installation on level 2 is reduced, since the sealing structures have already been produced and completely integrated in level 1. The trenches for accommodating the sealing structure may also act as vertical tolerance compensation.

Overall, there is a cost reduction compared to known micromechanical sensor devices, since in particular it is no longer necessary to use a complex housing, and instead only a housing with a spacer area corresponding to the area of the sealing structure is used.

The sensor functionality is improved since, due to the sealing trenches and the sealing compound contained therein, mechanical decoupling from the housing takes place which prevents transmission of stress.

According to another preferred refinement, the sensor chip includes a cavern that is spanned by a first diaphragm area on the lower side of the sensor chip, a recess being formed in the sensor area on the upper side of the sensor chip in such a way that the cavern is spanned by a second diaphragm area and the recess is at least partially filled with a protective medium. It is thus possible to situate the evaluation chip close to the diaphragm area, which generally includes the sensitive structures.

According to another preferred refinement, the sensor chip includes a cavern that is spanned by a third diaphragm area on the upper side of the sensor chip, and a protective film is applied at least to the sensor area. This simplifies manufacture, since the additional recess may be dispensed with.

According to another preferred refinement, a gas-permeable and water-impermeable grid device is provided in the sensor area on the upper side of the sensor chip. Media access only for gas may be easily achieved in this way.

According to another preferred refinement, a first cavity in which an area of the sensor chip is suspended via a suspension device that is fluid-permeable toward the lower side is situated beneath the grid device, the area of the sensor chip including a cavern that is spanned by a fourth diaphragm area on the lower side of the sensor chip, and the lower side of the sensor chip being bonded to an evaluation chip in such a way that a second cavity that is fluidically connected to the first cavity is formed beneath the fourth diaphragm area. An effective decoupling of tension in the diaphragm area may be achieved in this way.

According to another preferred refinement, the lower side of the sensor chip is bonded to the evaluation chip with the aid of a circumferential microfluidically seal-tight bonding frame. The diaphragm area is thus fluidically accessible only from the sensor area.

According to another preferred refinement, the lower side of the sensor chip is bonded to an evaluation chip that preferably includes one or multiple through holes. The sensor signals may thus be led over short distances from the sensor chip to the evaluation chip.

According to another preferred refinement, the sensor chip includes one or multiple through holes. The sensor signals may thus be led through the sensor chip.

According to one preferred refinement, the trench is provided in a substrate of the sensor chip. A very compact sensor device may be manufactured in this way.

According to another preferred refinement, the trench is provided in a molded area which is molded around the side of the sensor chip. A large area of the chip may thus be used as a sensor area.

According to another preferred refinement, the sealing medium and/or the protective medium are/is a rubber-elastic medium, in particular a silicone gel. These media have particularly good elastic properties as well as protective and sealing properties.

DETAILED DESCRIPTION

Identical or functionally equivalent elements are denoted by the same reference symbols in the figures.

Figure 1A:
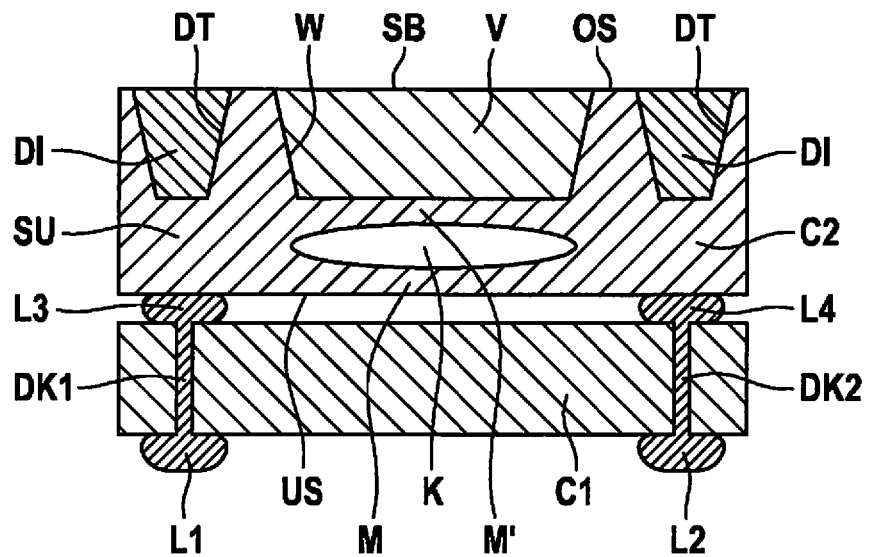
FIGS. 1a), 1b) show schematic cross-sectional illustrations for explaining a micromechanical sensor device having an integrated housing seal according to a first specific embodiment of the present invention, in particular on the chip level in FIG. 1a) and in the installed state in FIG. 1b).
Figure 1B:
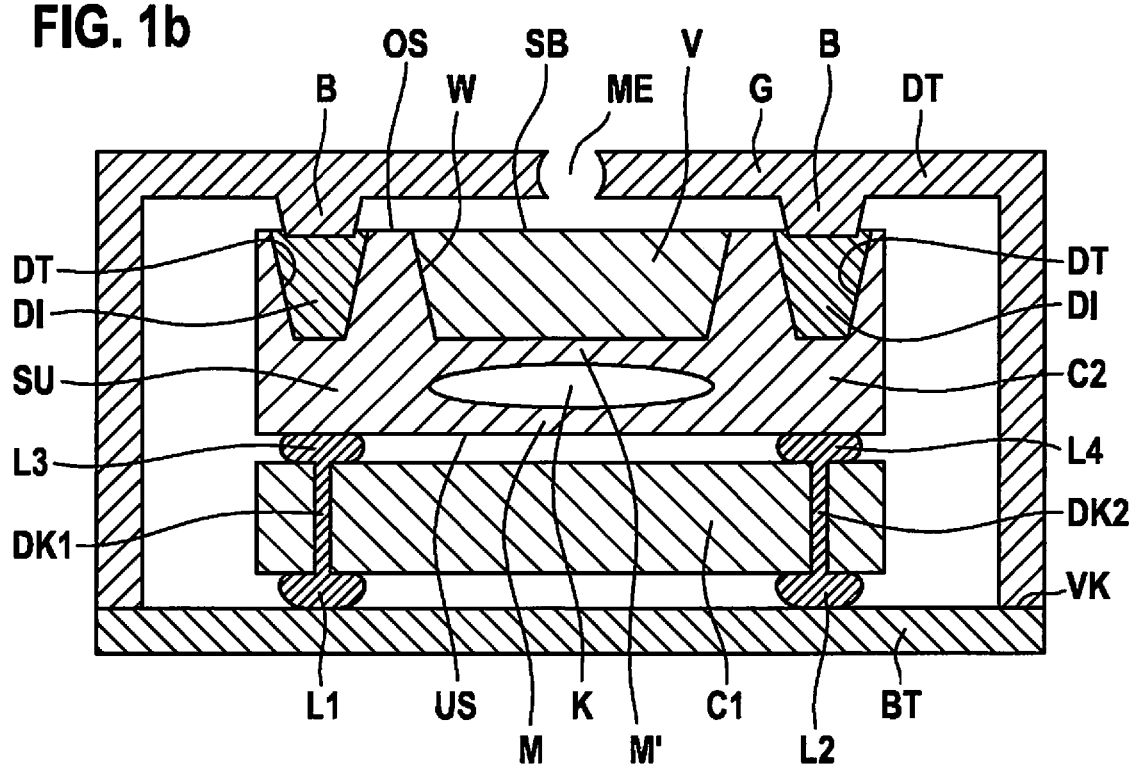

FIGS. 1a), 1b) are schematic cross-sectional illustrations for explaining a micromechanical sensor device having an integrated housing seal according to a first specific embodiment of the present invention, in particular on the chip level in FIG. 1a) and in the installed state in FIG. 1b).

In FIGS. 1a), 1b), reference symbol C2 denotes a micromechanical sensor chip, for example a micromechanical pressure sensor chip, that is formed in a substrate SU, for example a silicon substrate, with an upper side OS and a lower side US. On upper side OS a sensor area SB is provided which may be brought into contact with an environmental medium, for example, with the surrounding atmospheric air in the case of a pressure sensor chip.

Sensor chip C2 includes a circumferential trench DT that is formed in substrate SU and open toward upper side OS, and that circumferentially encloses sensor area SB, spaced apart from same. Trench DT is filled with a sealing medium DI, for example silicone, which is used for sealing a corresponding area of a housing G to be mounted thereon (see FIG. 1b)).

Sensor chip C2 includes a cavern K that is spanned by a first diaphragm area M on lower side US of sensor chip C2. For example, piezoresistive resistors with the aid of which a change in pressure is detectable are formed in first diaphragm area M.

A trough-shaped recess W is formed in sensor area SB on upper side OS of sensor chip C2 in such a way that cavern K is spanned by a second diaphragm area M' situated opposite from first diaphragm area M. Recess W is filled with a protective medium V, a silicone gel, for example, which may have a different material composition and different physical properties than sealing medium DI. Protective medium V protects second diaphragm area M' and structures possibly situated thereon from damage from liquids or gases, in particular water.

Lower side US of sensor chip C2 is bonded to an evaluation chip C1 (also referred to as an ASIC), which includes through holes DK1, DK2 that each end on both sides in a solder area L1, L2, L3, L4.

The manufacture of the micromechanical sensor device designed in this way as a chip stack C1, C2 preferably takes place on the wafer level.

For this purpose, substrates SU are initially provided with the necessary sensor structures. Sensor chip C2 is subsequently mounted on evaluation chip C1, for example by soldering, via solder balls L3, L4. Alternative joining processes include conductive gluing or thermocompression bonding.

Sensor chip C2 includes trench DT and recess W, which have been created with the aid of KOH etching or reactive ion etching, for example. Sealing medium DI and protective medium V are cost-effectively applied by dispensing, printing, or jetting.

In the example shown, the upper side of sealing medium DI or of protective medium V is in flush alignment with upper side OS of the substrate. However, depending on the type of housing and the application, a slight protrusion or recess may be provided, which may also be advantageously used for height compensation during assembly.

As illustrated in FIG. 1b), a packaged micromechanical sensor assembly is formed by the customer, for example, using the separated chip stacks together with evaluation chip C1 and sensor chip C2.

In the present example, for this purpose a housing G, for example a plastic housing, is used which includes a lower part BT and a cover part DT that, for example, are joined together in a sealing manner in an adhesion area VK. The chip stack is soldered or bonded in some other way to lower part BT of housing G with the aid of solder balls L1, L2 via evaluation chip C1.

Cover part DT includes an inwardly directed circumferential spacer area B, sensor chip C2 being mounted via evaluation chip C1 to the lower part in the interior of housing G in such a way that spacer area B is placed on sealing medium DI. An access opening ME for the environmental medium is provided in cover part DT above sensor area SB. As a result, the environmental medium may pass only into sensor area SB and a small area of substrate SU adjacent thereto, but not into the remainder of housing G. Pressures in the range of up to 50 bar may typically be withstood with such an assembly arrangement.

Figure 2:
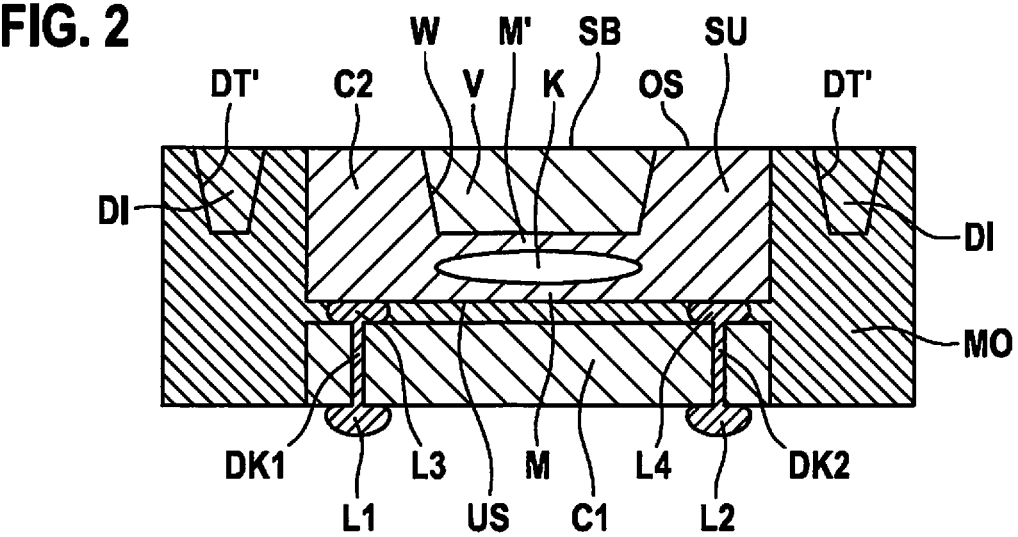
FIG. 2 shows a schematic cross-sectional illustration for explaining a micromechanical sensor device having an integrated housing seal on the chip level according to a second specific embodiment of the present invention.

FIG. 2 is a schematic cross-sectional illustration for explaining a micromechanical sensor device having an integrated housing seal on the chip level according to a second specific embodiment of the present invention.

In the second specific embodiment, in contrast to the first specific embodiment described above, trench DT is provided not in substrate SU of micromechanical sensor chip C2, but, rather, in a molded area MO laterally surrounding the chip stack made up of evaluation chip C1 and sensor chip C2. Molded area MO also extends into the area between evaluation chip C1 and sensor chip C2. Similarly to the first specific embodiment, sealing medium DI is filled into circumferential trench DT', which is situated in the periphery of sensor area SB in mold area MO on the upper side and open toward upper side OS.

Such a structure may be implemented, for example, by the known embedded wafer level BGA (eWLB) process. Trench DT' has the same function as in the first exemplary embodiment, and may be implemented by lasering or milling, for example. Solder balls L1, L2 and possibly further solder balls (not illustrated) may be situated, also beneath molded area MO, in such a way that an advantageous distribution of the mechanical load when connected to lower part BT of housing G is achievable.

In other respects, the assembly takes place similarly to the first specific embodiment according to FIG. 1b), spacer area B being adapted according to the dimensioning of trench DT'.

Figure 3:
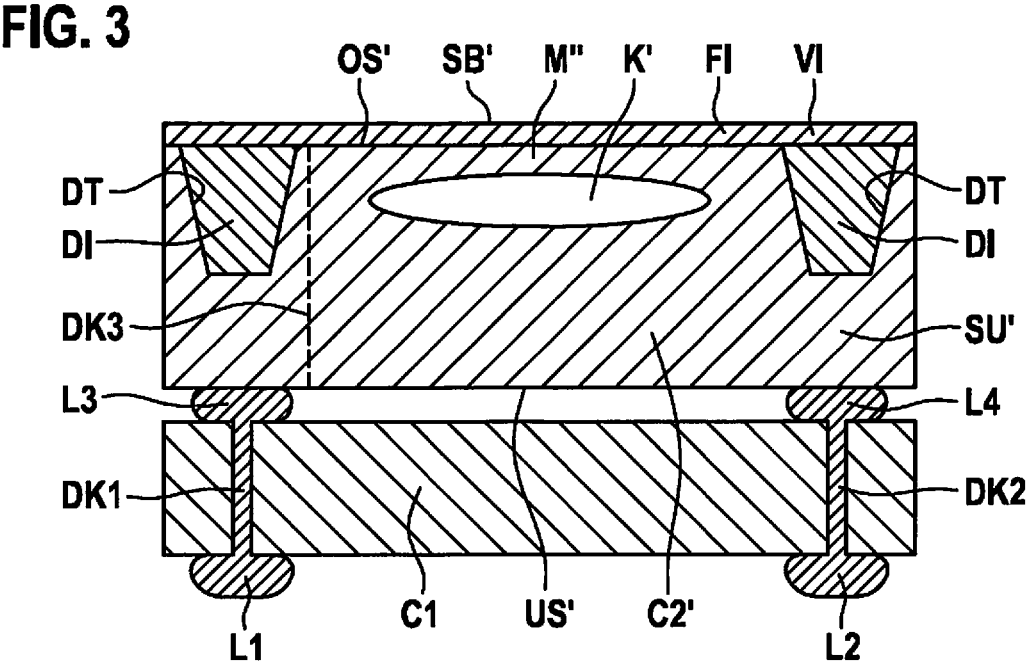
FIG. 3 shows a schematic cross-sectional illustration for explaining a micromechanical sensor device having an integrated housing seal on the chip level according to a third specific embodiment of the present invention.

FIG. 3 is a schematic cross-sectional illustration for explaining a micromechanical sensor device having an integrated housing seal on the chip level according to a third specific embodiment of the present invention.

In the third specific embodiment, sensor chip C2' includes a cavern K' that is spanned by a diaphragm area M" on upper side OS' of sensor chip C2'. Sensor chip C2' is bonded to an evaluation chip C1 on lower side US'.

Substrate SU' of micromechanical sensor chip C2' in this case preferably includes one or multiple through holes DK3 with the aid of which signals may be electrically conducted from the pressure detection device (not illustrated) in diaphragm area M" through sensor chip C2' to evaluation chip C1 (schematically illustrated here as a dashed line).

The same as in the first specific embodiment, the circumferential trench, open at the top, is provided on upper side OS' of substrate SU'. A protective film FI, for example a silicone film, is applied at least to sensor area SB' in order to protect sensor area SB'. In the present example, this protective film FI covers entire chip C2'. This film may also be applied on the wafer level prior to separating the chip.

The assembly of the chip stack made up of evaluation chip C1 and sensor chip C2' in housing G takes place similarly to the first and second specific embodiments described above. Protective film FI applied to sealing medium DI does not have an adverse effect, provided that it is made of a protective medium having appropriate protective properties.

Figure 4:
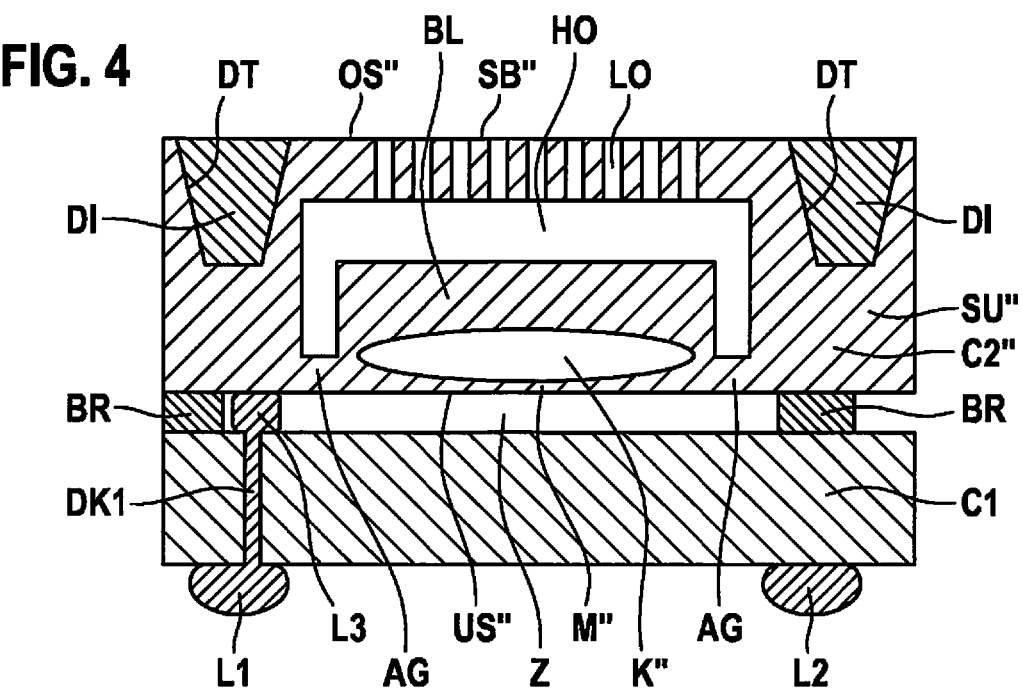
FIG. 4 shows a schematic cross-sectional illustration for explaining a micromechanical sensor device having an integrated housing seal on the chip level according to a fourth specific embodiment of the present invention.

FIG. 4 is a schematic cross-sectional illustration for explaining a micromechanical sensor device having an integrated housing seal on the chip level according to a fourth specific embodiment of the present invention.

In the fourth specific embodiment, a gas-permeable and water-impermeable grid device LO is provided in sensor area SB" on upper side OS" of sensor chip C2".

Beneath grid device LO is situated a first cavity HO in which a block-shaped area BL of sensor chip C2" is laterally suspended, close to lower side US", via a suspension device AG that is fluid-permeable with respect to lower side US".

Block-shaped area BL of sensor chip C2" includes a cavern K" that is spanned by a fourth diaphragm area M" on lower side US" of sensor chip C2". Lower side US" of sensor chip C2" is bonded, with the aid of a circumferential microfluidically seal-tight bonding frame BR, to an evaluation chip C1 in such a way that a second cavity Z that is fluidically connected to first cavity HO is formed beneath fourth diaphragm area M".

The gaseous environmental medium thus laterally moves past block-shaped area BL of sensor chip C2" toward lower side US", fluid-permeable suspension device AG including, for example, holes (not illustrated) along its periphery.

In the fourth specific embodiment, sensor chip C2" includes a circumferential trench DT that is formed in substrate SU" and open toward upper side OS", and that circumferentially encloses sensor area SB", spaced apart from same. Trench DT is filled with a sealing medium DI, for example silicone, which is used for sealing a corresponding area of a housing G to be mounted thereon.

Figure 5:
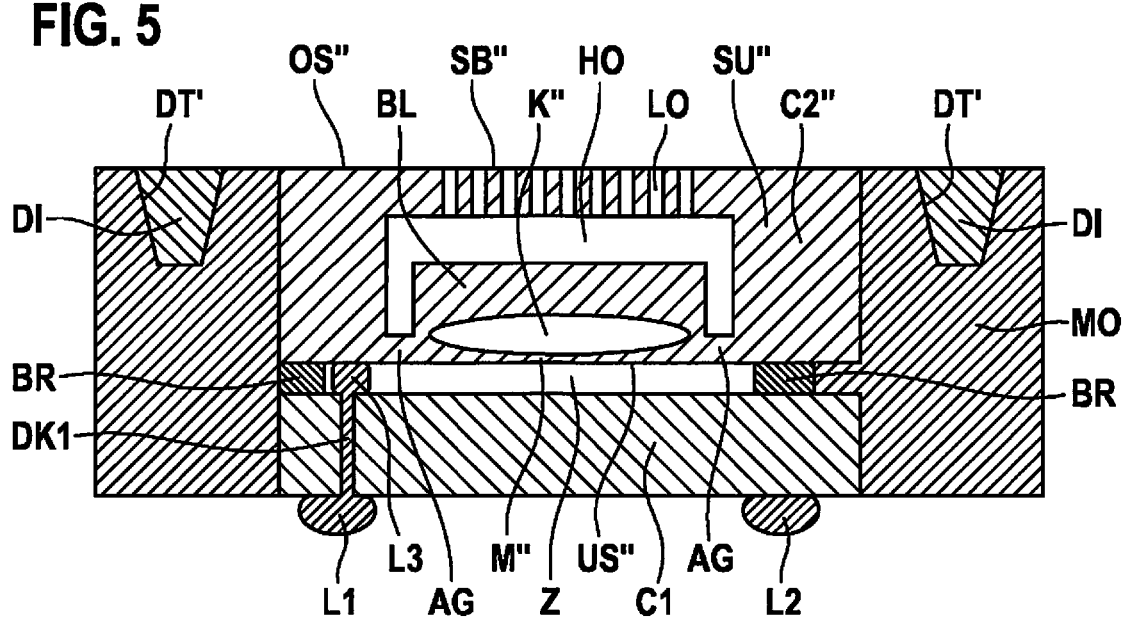
FIG. 5 shows a schematic cross-sectional illustration for explaining a micromechanical sensor device having an integrated housing seal on the chip level according to a fifth specific embodiment of the present invention.

FIG. 5 is a schematic cross-sectional illustration for elucidating a micromechanical sensor device having an integrated housing seal on the chip level according to a fifth specific embodiment of the present invention.

The fifth specific embodiment differs from the fourth specific embodiment in that trench DT' is provided not in substrate SU" of micromechanical sensor chip C2", but, rather, in a molded area MO which laterally surrounds the chip stack, made up of evaluation chip C1 and sensor chip C2". Molded area MO also extends into the area between evaluation chip C1 and sensor chip C2", but not into second cavity Z beneath diaphragm area M". Similarly to the second specific embodiment, sealing medium DI is filled into circumferential trench DT', which is situated in the periphery of sensor area SB" in molded area MO on the upper side and open toward upper side OS".

Although the present invention has been described with reference to preferred exemplary embodiments, it is not limited thereto. In particular, the stated materials and topologies are by way of example only, and are not limited to the described examples.

Examples of particularly preferred further applications for the micromechanical sensor device according to the present invention with an integrated housing seal are chemical gas sensors such as metal oxide gas sensors, as well as heat conductivity sensors, Pirani elements, mass flow sensors such as air mass flow meters, lambda sensors on a micromechanical diaphragm, infrared sensor devices, etc.

What is claimed is:

1. A micromechanical sensor device having an integrated housing seal, comprising:
   a micromechanical sensor chip having an upper side and a lower side, wherein a sensor area adapted to be brought into contact with an environmental medium is provided on or at the upper side; and
   at least one circumferential trench provided in a periphery of the sensor area and open toward the upper side, wherein the trench is at least partially filled with a sealing medium for sealing a corresponding area of a housing to be mounted thereon, and wherein the trench is provided in a substrate of the sensor chip.

2. The micromechanical sensor device as recited in claim 1, wherein:
   the sensor chip includes a cavern that is spanned by a first diaphragm area on the lower side of the sensor chip, and
   a recess is formed in the sensor area on the upper side of the sensor chip in such a way that the cavern is spanned by a second diaphragm area and the recess is at least partially filled with a protective medium.

3. The micromechanical sensor device as recited in claim 2, wherein at least one of the sealing medium and the protective medium is a rubber-elastic medium.

4. The micromechanical sensor device as recited in claim 2, wherein at least one of the sealing medium and the protective medium is a silicone gel.

5. The micromechanical sensor device as recited in claim 1, wherein:
   the sensor chip includes a cavern that is spanned by a diaphragm area on the upper side of the sensor chip, and
   a protective film made of a protective medium is applied at least to the sensor area.

6. The micromechanical sensor device as recited in claim 1, further comprising a gas-permeable and water-impermeable grid device provided in the sensor area on the upper side of the sensor chip.

7. The micromechanical sensor device as recited in claim 6, wherein:
- a first cavity in which an area of the sensor chip suspended via a suspension device that is fluid-permeable toward the lower side is situated beneath the grid device,
- the area of the sensor chip includes a cavern that is spanned by a diaphragm area on the lower side of the sensor chip, and
- the lower side of the sensor chip is bonded to an evaluation chip in such a way that a second cavity that is fluidically connected to the first cavity is formed beneath the diaphragm area.

8. The micromechanical sensor device as recited in claim 7, wherein the lower side of the sensor chip is bonded to the evaluation chip with the aid of a circumferential microfluidically seal-tight bonding frame.

9. The micromechanical sensor device as recited in claim 1, wherein the lower side of the sensor chip is bonded to an evaluation chip that includes at least one through hole.

10. The micromechanical sensor device as recited in claim 1, wherein the sensor chip includes at least one through hole.

11. A micromechanical sensor assembly, comprising:
- a micromechanical sensor device having an integrated housing seal and including:
  - a micromechanical sensor chip having an upper side and a lower side, wherein a sensor area adapted to be brought into contact with an environmental medium is provided on or at the upper side, and
  - at least one circumferential trench provided in a periphery of the sensor area and open toward the upper side, wherein the trench is at least partially filled with a sealing medium for sealing a corresponding area of a housing to be mounted thereon, and wherein the trench is provided in a substrate of the sensor chip; and
- a housing that includes a lower part and a cover part that is connected to the lower part, wherein:
  - the cover part includes an inwardly directed circumferential spacer area,
  - the sensor chip is one of directly and indirectly mounted on the lower part in an interior of the housing in such a way that the spacer area is placed on the sealing medium, and
  - an access opening for the environmental medium is provided in the cover part above the sensor area.

* * * * *